(12) United States Patent
Mons et al.

(10) Patent No.: US 7,597,538 B2
(45) Date of Patent: Oct. 6, 2009

(54) THERMOSTRUCTURAL TURBOMACHINE PART THAT IS CIRCULARLY SYMMETRICAL ABOUT A LONGITUDINAL AXIS, THE PART INCLUDING AN ANNULAR WIPER, AND A METHOD OF MANUFACTURE

(75) Inventors: Claude Marcel Mons, Savigny le Temple (FR); Joël Olivier Alfred Abel Vigneau, Champcueil (FR)

(73) Assignee: SNECMA, Paris (FR)

( * ) Notice: Subject to any disclaimer, the term of this patent is extended or adjusted under 35 U.S.C. 154(b) by 507 days.

(21) Appl. No.: 11/560,131

(22) Filed: Nov. 15, 2006

(65) Prior Publication Data

US 2007/0116556 A1 May 24, 2007

(30) Foreign Application Priority Data

Nov. 15, 2005 (FR) .................................... 0511577

(51) Int. Cl.
*F01D 11/02* (2006.01)
(52) U.S. Cl. .................. 415/174.5; 415/230; 156/62.2; 219/121.66; 219/121.85
(58) Field of Classification Search ............. 415/173.5, 415/174.5, 230; 277/412, 418–421; 156/62.2, 156/272.8; 219/121.66, 121, 8, 121.85
See application file for complete search history.

(56) References Cited

U.S. PATENT DOCUMENTS 3,537,713 A  11/1970  Matthews et al.
4,863,538 A * 9/1989  Deckard ..................... 264/497
5,024,451 A * 6/1991  Borowski ................... 277/412
6,478,304 B1  11/2002 Hoffelner

FOREIGN PATENT DOCUMENTS

| DE | 474361 | 3/1929 |
| DE | 43 41 216 A1 | 6/1995 |
| DE | 199 57 771 A1 | 6/2001 |
| GB | 2128693 A * | 5/1984 |
| JP | 03282074 A * | 12/1991 |
| WO | WO 2005/053860 A2 | 6/2005 |

OTHER PUBLICATIONS

U.S. Appl. No. 11/560,034, filed Nov. 15, 2006, Mons, et al.
U.S. Appl. No. 11/560,172, filed Nov. 15, 2006, Mons, et al.
U.S. Appl. No. 11/560,100, filed Nov. 15, 2006, Mons, et al.

* cited by examiner

*Primary Examiner*—Ninh H Nguyen
(74) *Attorney, Agent, or Firm*—Oblon, Spivak, McClelland, Maier & Neustadt, L.L.P.

(57) ABSTRACT

In the method, a support is provided that presents a base for an annular wiper, and a wiper is built up that presents height that varies around its circumference, by forming a plurality of projecting portions by performing following successive steps:
a laser source connected to an optical head focused on a point on the top surface of the base is activated, as is a source of powder connected to the spray nozzle, thereby forming a localized melt at said point, into which the powder is injected, thus forming a localized region of extra thickness; and
the optical head and the nozzle are aimed at another point adjacent to said region of extra thickness and the method returns to the preceding step until the layer of material is completed in the angular sector in question.

18 Claims, 3 Drawing Sheets

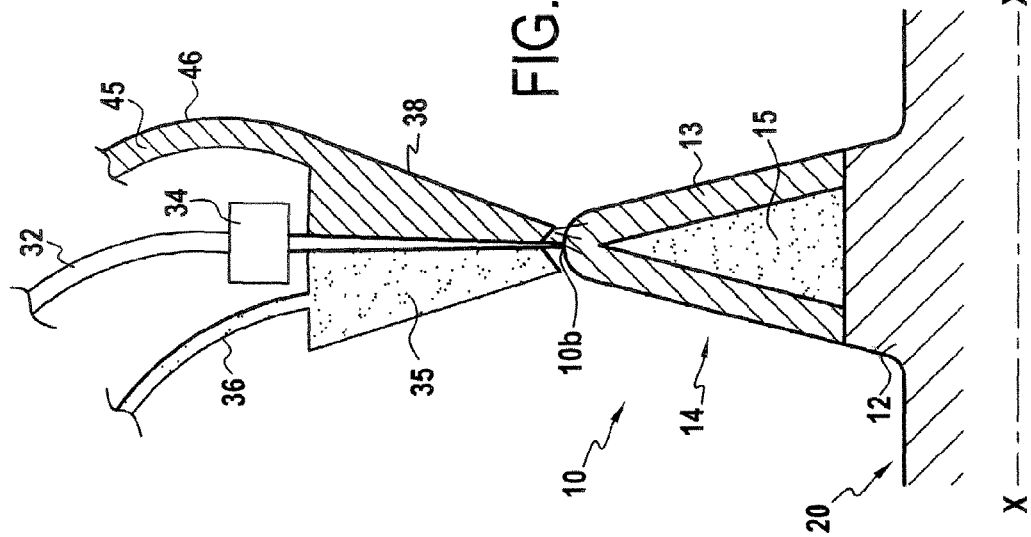
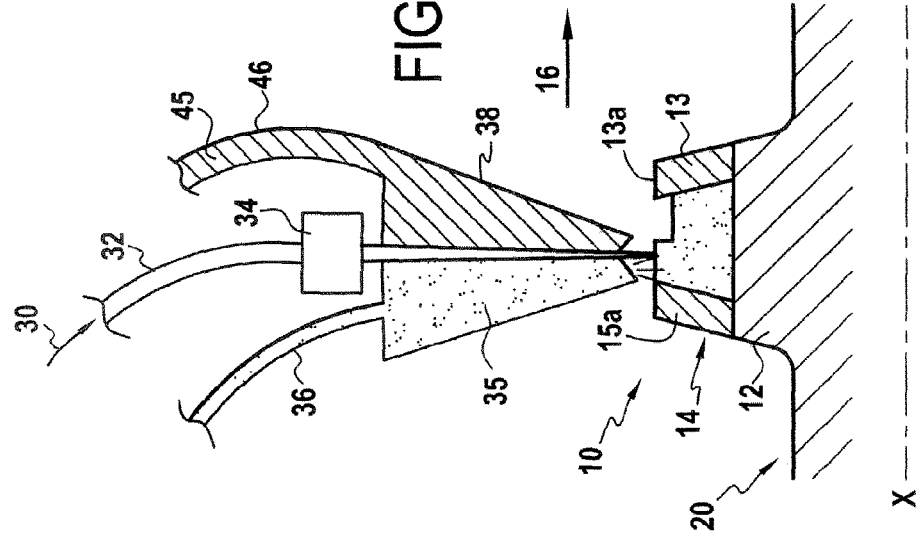

THERMOSTRUCTURAL TURBOMACHINE PART THAT IS CIRCULARLY SYMMETRICAL ABOUT A LONGITUDINAL AXIS, THE PART INCLUDING AN ANNULAR WIPER, AND A METHOD OF MANUFACTURE

The invention relates to a thermomechanical turbomachine part that is circularly symmetrical about a longitudinal axis, the part including at least one annular wiper for a sealing labyrinth, and the invention also relates to a method of manufacturing it.

BACKGROUND OF THE INVENTION

A sealing labyrinth, also known as a labyrinth seal, comprises a rotary portion having fins (or wipers) and a static bore covered in a soft abradable material or in a honeycomb structure capable of withstanding high temperatures. When the engine starts, the fins rub lightly against the lining, biting into it, thus leading to minimum spacing. This clearance varies over various cycles in flight, depending on the expansion of the part and on the natural flexibility of the moving portions.

The wipers of labyrinths serve to provide aerodynamic sealing between enclosures containing air at different pressures. They are generally situated on the rotor portion facing stator portions. They are mainly constituted by continuous or segmented "blades" of annular shape, capable of being directed radially inwards or outwards.

In particular, when they are continuous in shape, wipers are liable to come into contact with the stator in certain operating configurations. In order to avoid them being destroyed in such situations, stators are fitted with coatings that provide the interface and that are referred to as being "abradable". Under such circumstances, the usual sequences for wiper penetration into the abradable layer consist in a radial cut associated with an axial displacement ("straight turning").

In reality, the usual abradable materials can turn out to be relatively abrasive, in particular against certain continuous wipers, particularly if they are made of titanium-based alloy, but also if they are made of steel or of nickel-based alloy. This is particularly true when the abradable linings are made in the form of honeycombs of refractory alloy.

In order to avoid wipers being damaged, or even destroyed, they are commonly coated by thermally spraying (plasma torch, high velocity oxyfuel (HVOF), . . . ) an abrasive deposit of the alumina and titanium dioxide or carbide type, e.g. on an underlayer of aluminum and nickel alloy in order to provide bonding.

Deposition by thermal spraying requires relative spray angles to be complied with between the axis of the torch and the surfaces of the parts to be coated, so that the sprayed particles impact as close as possible to orthogonally on the surface for coating in order to obtain a deposit of satisfactory quality and with satisfactory bonding. That technique also requires a minimum distance between the spraying tool and the surface: the hot central zone of the flame from the torch can be at several thousands of degrees centigrade, so it must be kept far enough away from the part; in addition, the particles to be deposited must be accelerated sufficiently to adhere on the surfaces that are to be protected.

Furthermore, the propellant or plasma-generating gases used for spraying purposes must be easy to exhaust while ensuring that the sprayed powder is not "blown about" by creating turbulence.

In general, the wipers are oriented practically orthogonally to the cylindrical surfaces of the rotors, and they are often situated close to disk or labyrinth sheets at the bottoms of cavities or close to other wipers when they are placed in series.

Amongst these situations, numerous circumstances arise that present a geometrical arrangement that makes deposition by thermal spraying very uncertain or practically impossible.

As a result, the abrasive coating is deposited preferentially only on the end (tip) of the wiper and as a result its flanks are poorly protected, which can lead to the wiper becoming worn more quickly.

OBJECTS AND SUMMARY OF THE INVENTION

An object of the present invention is to overcome that drawback by proposing a solution that makes it possible to avoid making a deposit by thermal spraying while nevertheless being able to make wipers that are not damaged by coming into contact with the abradable ring.

For a thermomechanical turbomachine part that is circularly symmetrical about a longitudinal axis, the part including at least one annular wiper for a sealing labyrinth, said wiper being coated in an abrasive material, this object of the invention is achieved:

by the fact that the thermomechanical turbomachine part is fitted with a wiper that presents height in a radial direction that varies around its circumference, forming a plurality of radially-projecting portions.

It will thus be understood that the wiper does not form a continuous blade of constant height, and because of the presence of distinct projecting portions, i.e. because of a wiper transverse profile having an outer outline that is not circular, it serves not only to perform a sealing function, but also acts like a "cutting tool". Thus, it can even be possible to omit depositing an abrasive coating.

In the invention, a continuous blade of constant section and coated by a protective deposit that is likewise continuous and obtained by thermal spraying, is replaced by a wiper formed by a continuous or discontinuous blade made up of abrasive or cutting elements that result from different projecting portions distributed over different angular sectors.

In particular, provision is made for the wiper to form a discontinuous ring of section that presents a plurality of projecting portions around its circumference with gaps or breaks in height existing between them.

In this way, sawteeth are formed directly in the volume of the wiper, thereby making it easier to cut into the abradable material in comparison with a wiper constituted by a continuous blade.

The invention also provides a method of manufacturing an annular wiper for a sealing labyrinth on a thermomechanical turbomachine part that is circularly symmetrical about a longitudinal axis.

The invention seeks to provide a method that makes it simple to fabricate such a wiper without having recourse to deposition by thermal spraying.

To this end, the invention provides a method of fabricating an annular wiper on a thermomechanical support, in particular for a sealing labyrinth, the method comprising the following steps:

a) providing a support with circular symmetry about a longitudinal axis, the support presenting an annular base for the wiper;

b) providing at least one source of a powder material and a spray nozzle connected to said source and suitable for moving relative to the support;

c) providing a laser source connected to an optical head suitable for moving relative to the support to focus a laser beam on a point of the surface of the support;

d) aiming both the optical head and the nozzle at a common point on the surface at the top of the base of the wiper;

e) activating the laser source and the source of powder material, thereby forming a localized melt at said point, into which the powder material is injected, thereby forming a localized region of increased thickness;

f) aiming the optical head and the nozzle at another point on the surface at the top of the base adjacent to said localized region of extra thickness, and repeating step e) so long as the layer of material has not been terminated for the angular sector in question, said wiper comprising a plurality of angular sectors each containing a projecting portion between two gaps; and g) building each projecting portion of the wiper by depositing successive layers that become narrower in the longitudinal direction on the surface at the top of the base, each layer being the result of performing steps d) to f).

It will be understood from the above that instead of using thermal spraying to deposit an abrasive coating on the surface of a previously-machined wiper, the invention proposes building up the wiper in full, or over at least a fraction of the height of the tip of said wiper, and to do so by using laser spraying.

In addition, a plurality of projecting portions are made that are distributed over different angular sectors, thereby creating a wiper with a transverse profile having an outer outline that is not circular, such that the wiper performs not only a sealing function, but also acts as a "cutting tool".

Laser spraying consists in using a laser beam that can be aimed very accurately to create a highly localized melt on the part, and in injecting into said melt a powder (made of metal and/or ceramic) that can be abrasive. Thus, unlike thermal spraying, there is no need to heat the powder, and its path can thus be separate from that of the laser beam.

The laser beam propagates from its source to the target over an optical path. The optical path is built up either by a succession of mirrors that receive the beam and that reflect it in a different direction, together with lenses that cause the beam to converge or diverge or remain parallel, or else the path is provided by an optical fiber.

Either way, the optical path is terminated by a system of lenses referred to as an "optical head" causing the beam to converge on a point at a certain distance away therefrom. Zones of the part that were difficult to access with the torch devices used to perform thermal spraying can now be reached by a laser spray device providing there is no obstacle between the optical head and the point of impact for the beam on the part. With thermal spraying, it is necessary for the powder to arrive so that it impacts in a direction normal to the surface that is to be coated. With the method proposed in the present invention, in completely different manner, laser spraying only requires a melt to be filled, and the powder can be delivered over a wide variety of trajectories relative to the surface receiving the powder.

The metal powder is delivered by a powder dispenser. It travels along a tube having an end fitted with a nozzle that directs the powder towards the melt created by the laser beam. The tube may be flexible and guided by a rigid support arm or by a robot or by any other positioning device, or it may itself be rigid and pointed towards the zone of the part that is to be coated.

Other differences can be identified between the thermal spraying method and the laser spraying method.

With thermal spraying, the nozzle transmitting the hot gas must be close to the surface that is to be coated, whereas with laser spraying, the optical head can be relatively distant from said surface. With thermal spraying, the powder must be heated since it must follow the same trajectory as the hot gas, but this does not apply to laser spraying in which the trajectory of the powder can be separate from that of the laser beam.

In addition, with thermal spraying, a continuous coating method is provided, whereas with laser spraying, given the flexibility with which a laser beam can be controlled, it is possible to perform spraying either continuously or sequentially, merely by switching the laser beam on and off.

Furthermore, it will be understood that the solution in accordance with the present invention avoids any need to machine the tip of the wiper, where said tip is in a location that is relatively difficult for it to be machined. By means of the method of the present invention, the tip of the wiper is built up layer by layer, optionally simultaneously with a coating of a different material that is sufficiently abrasive.

In this respect, it should be observed that the method can be used for building up the wiper over its full height (in which case the annular wiper base is merely an annular segment of the outside surface of the support, e.g. the rotor), or else the method can be used solely for building up the wiper over that portion of its height that forms its end or its tip (in which case the annular wiper base presents an annular volume extending over a certain height and obtained by prior machining).

In step e), the laser source and the source of powder material are activated successively or almost simultaneously so that the localized melt is present at the location where the laser beam is directed when the powder reaching that location impacts against said surface.

It is preferable to build up each projecting portion of the wiper in strata, beginning with a new layer over the entire area of the top of the angular sector in question of the wiper, prior to continuing to build it up radially outwards.

Nevertheless, other methods can be devised for building up each projecting portion of the wiper, including building an angular sector layer by layer prior to continuing by building another angular sector, and so on so as to form one complete projecting portion, or indeed by using a plurality of optical heads and a plurality of nozzles, so as to build up simultaneously a plurality of angular sectors of the wiper and/or of the projecting portion of the wiper.

Preferably, during step g), for each projecting portion, the layers become smaller and smaller in the circumferential direction.

In this way, each projecting portion presents a circumferential extent that becomes smaller and smaller in the radially outward direction, thereby forming a tip of pointed shape.

Advantageously, during step g), the layers remain centered about an angular zone remote from both of the gaps that are adjacent to the projecting portion, so that the tip of the projecting portion is built up in said zone. Under such circumstances, the tip is remote from both circumferential ends of each projecting portion.

Alternatively, during step g) the layers cover a circumferential end of the projecting portion. Under such circumstances, the tip is situated at one of the two circumferential ends of each projecting portion, thereby obtaining a sawtooth shape.

Preferably, during step f), the surface of the top of the wiper base is followed in a longitudinal direction prior to changing angular sector.

Under such circumstances, for each projecting portion, each layer is built up line by line by moving the target point of the optical head and of the nozzle along said line (or by moving the support relative to the laser spray equipment) parallel to the longitudinal direction parallel to the axis of revolution, prior to shifting through an angular offset and beginning with a new line, until the entire layer has been built up.

Naturally, it is possible to devise other paths to be followed when building up each layer, for example fabricating incomplete annular beads (or angular segments of annular beads) one after another, which beads are offset a little in the longitudinal direction relative to one another.

In another preferred disposition, during step f), the laser source and the source of powder material remain activated.

In this way, it is possible to build up the wiper continuously by forming successive islands of material, either so as to build up the entire wiper, or else in sequences, each corresponding to fabricating a portion (e.g. one complete layer of the wiper or one tooth-forming projecting portion). Alternatively, or in combination with those various options, it is also possible, in particular in zones that are the most difficult to reach and/or that present the smallest dimensions, to deposit material point by point with the laser source and the source of material being deactivated during step f).

Preferably, said support is a thermomechanical turbomachine part that is circularly symmetrical about a longitudinal axis (X-X'), in particular it is the rotor of a turbomachine.

In addition, and preferably, in step f), the angular sector in question defines a projecting portion between two gaps. Under such circumstances, each angular sector in question defines a different projecting portion over the entire height of the wiper.

BRIEF DESCRIPTION OF THE DRAWINGS

The description refers to the accompanying drawings, in which:

FIGS. 2 and 3 are diagrammatic fragmentary axial section views on a larger scale of a circularly symmetrical thermomechanical part showing how the cross-section and the profile of the wiper vary while implementing the method in accordance with the present invention;

MORE DETAILED DESCRIPTION

Since the present invention relates to sealing wipers for a circularly symmetrical thermomechanical part of a turbojet, in particular for a rotor, the description below relates to one possible and non-limiting application of a wiper of this shape in accordance with is the present invention.

Figure 1:
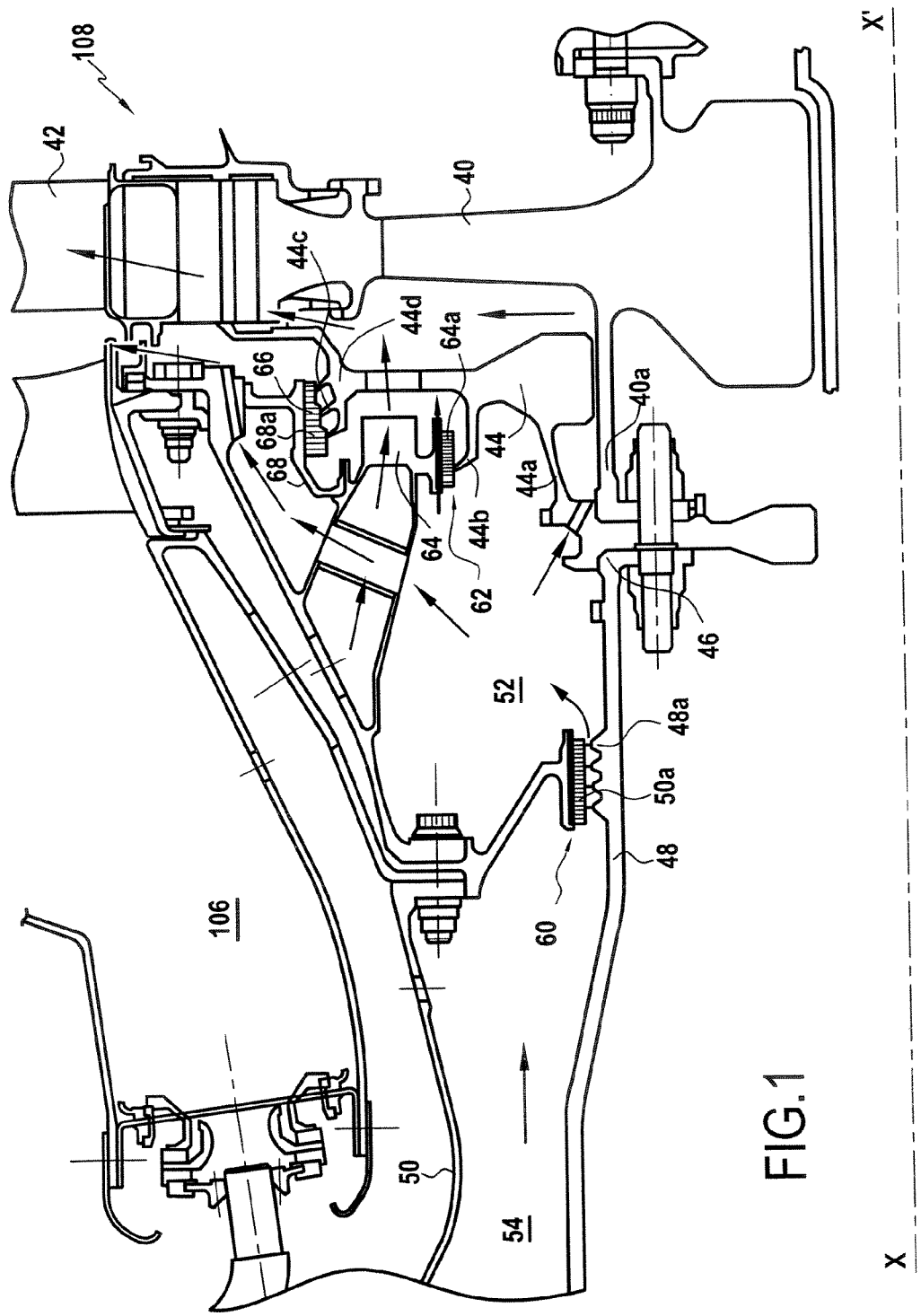
FIG. 1 is an axial half-section of a turbine rotor of a turbojet showing the disposition of the end plate and the sealing labyrinths upstream from the main injectors.

FIG. 1 shows a circumstance in which the wipers are used in sealing labyrinths and are disposed facing abradable elements. It relates to a ventilation circuit for a high pressure turbine disposed downstream from a combustion chamber 106.

In particular, there is a turbine 108 having its circularly symmetrical rotor movable in rotation about an axis X-X'.

The rotor of the turbine 108 comprises a turbine disk 40 fitted with blades 42, and an end plate 44 disposed upstream from the disk 40. Both the disk 40 and the end plate 44 have a respective upstream flange referenced 40*a* for the disk 40 and 44*a* for the end plate 44, enabling them to be secured to the downstream end 46 of the downstream cone 48 of the high pressure compressor driven by the rotor of the turbine 108.

This arrangement of the cooling circuit has three successive discharge labyrinths.

A first discharge labyrinth 60 is formed upstream from the enclosure 52 separating the end plate 44 from the end of the chamber, and downstream from the enclosure 54 separating the downstream cone 48 of the high pressure compressor from the inner casing 50 of the combustion chamber 106. This first discharge labyrinth 60 comprises wipers 48*a* formed on the downstream cone 48 and a ring 50*a* of abradable material mounted at the end of a plate secured to the inner casing 50.

A second discharge labyrinth 62 is situated under injectors 64, downstream from the enclosure 52. This second discharge labyrinth 62 is made up of wipers 44*b* of the end plate 44 and a ring of abradable material 64*a* mounted on the injectors 64.

The third discharge labyrinth 66 is situated above the injectors 64 and comprises three successive wipers 44*c* formed on an angled portion 44*d* of the end plate 44, and an abradable sealing ring 68*a* mounted on the inner casing 68.

According to the invention, all or some of the various wipers 48*a*, 44*b*, and 44*c* are not coated by thermal spraying but are built by laser spraying and present a shape of width (in the radial direction) that varies around their circumference, and not a shape comprising a ring of constant width.

In FIG. 1, the present invention is shown in application with a high pressure turbine. Nevertheless, it should be understood that the present invention can be implemented in other zones of a turbomachine, in particular in a high pressure compressor, in a low pressure compressor, or in a low pressure turbine.

Likewise, in FIG. 1, the wipers are disposed on a moving rotor with all of them being directed radially outwards. Nevertheless, it will readily be understood that the present invention can apply equally to wipers that are directed radially inwards towards the axis of rotation.

By way of example, an embodiment in accordance with the present invention is described below with reference to FIGS. 2 to 4.

Figure 4:
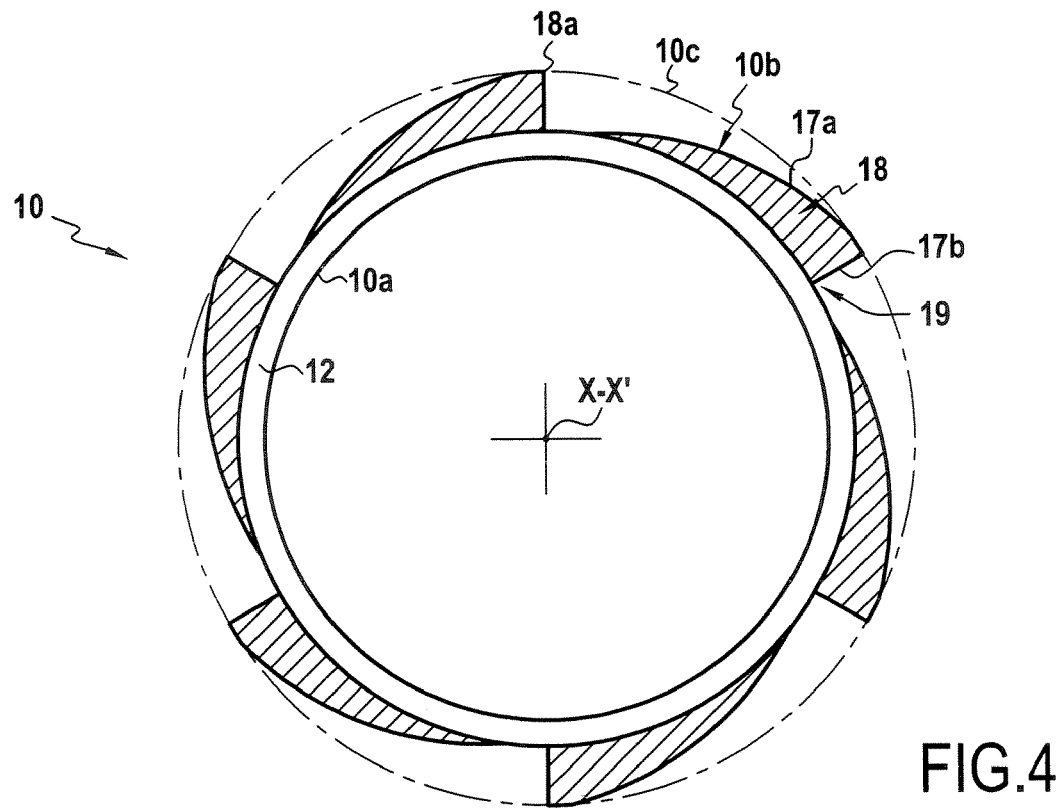
FIG. 4 is a cross-section view of the circularly symmetrical thermomechanical part showing the flank of the wiper after it has been made in accordance with the present invention.

In FIG. 4, there can be seen the axis of rotation X-X' about which a wiper 10 extends radially, presenting an inner outline 10*a* that is circular about the axis X-X', and an outer outline 10*b* that is circumscribed within a circle 10*c* of axis X-X' that is marked as a chain-dotted line. It can be considered that the circle 10*c* forms the outer outline of an annular wiper in accordance with the prior art, i.e. a wiper that presents a height that is constant all around its circumference.

In this example, the outer outline 10*b* is in the form of six substantially curved lines 17*a*, each extending over an angle of 60°, and at distance from the axis X-X' that varies progressively, each increasing in a clockwise direction in FIG. 4. These six curved lines 17*a* extending the base 12 co-operate with six radial lines 17*b* to define teeth 18 between gaps 19 constituted by breaks in the height of the wiper 10.

As a result, each projecting portion is formed by a tooth 18 that presents a height that varies progressively in the same direction going from one gap 19 to the following gap 19.

It should be observed that the lines 17*b* are not necessarily parallel to a radius, but that in general they interconnect the top 18*a* of a tooth (the end of a curved line 17*a*) to the base 12 or to the other end of a following curved line 17*a*.

To understand more precisely the shape of this outer outline 10*b*, reference is made below to FIGS. 2 and 3 which show the method of fabricating the wiper 10 by machining.

In longitudinal section on a plane containing the axis X-X', the outer profile of the wiper 10, as shown in FIG. 3, presents a shape that is substantially an upside-down V-shape or an upside-down U-shape with the limbs of the U-shape sloping towards the top of the wiper defined by the outer outline 10b.

This description thus corresponds to a wiper having a section of the same shape as in the prior art, i.e. with a profile that is substantially in the form of an upside-down V-shape or U-shape. However, unlike a prior art wiper, and as shown in FIG. 4, a wiper 10 of the present invention is not strictly annular, i.e. it does not present height that is constant all around its circumference.

Furthermore, as explained above, in the prior art, the wiper is machined directly in the support in order to obtain the above-outlined shape, and then the wiper is coated in a deposit obtained by thermal spraying in order to reinforce its abrasion-resistance properties.

In contrast, in the present invention, the support 20 is machined solely to provide a base 12 that projects from the top surface of the support 20 by no more than a few millimeters in order to initiate the beginning of the shape for the wiper 10.

Thereafter, to make the remainder of the wiper 10, i.e. its end or tip 14, while forming teeth 18 as shown in FIG. 4, equipment is used that is suitable for performing laser spraying (not shown in full).

This equipment comprises the following portions:
- a system enabling the support 20 to be held and moved, in particular in rotation and in translation;
- a laser ($CO_2$ or YAG) source 30 having a system for transmitting a laser beam 32 by reflection on mirrors or by using an optical fiber so as to reach an optical head 34;
- the optical head 34 presents a focal length that corresponds to the distance between the head and the surface to be coated, said optical head 34 being secured to a positioning apparatus capable of placing it in such a manner that the focus of the beam can scan all of the points of a straight section of the surface to be coated, or of the volume to be built; and
- at least one source of a first powder material 35 comprising a powder-metering dispenser as well as a feed tube 36 for feeding the powder to a nozzle 38.

In the example shown, a source of a second powder material is also provided that is connected to the nozzle 38 by a corresponding feed pipe 46.

It will thus be understood that it is preferable to supply both a first powder material source and a second powder material source for providing first and second powders 35 and 45, said first source and said second source both being connected to the spray nozzle 38.

In the circumstances shown diagrammatically in FIGS. 2 and 3, the optical head 34 and the nozzle 38 form a single assembly, i.e. the optical head 34 and the spray nozzle 38 are secured to each other in a common spray assembly of position that is adjustable relative to the support 20.

Nevertheless, the nozzle 38 could equally well be situated separately beside the laser beam, being supported by positioning apparatus specific thereto in order to enable it to follow the movements of the focus point of the laser beam.

With reference to FIG. 2, it should be understood that the tip 14 of the wiper 10 for each tooth 18 that forms a projecting portion is built up layer by layer up to the free end of the tip 14, i.e. the top 18a of the tooth, while defining the outer outline 10b.

Either the wiper is built on the base 12 tooth by tooth, and within each tooth 18 layer by layer, or else it is also possible to build all of the teeth simultaneously, completing a given layer on all of the teeth 18 before moving onto the next layer of material above it.

The height of each tooth 18, i.e. the radial distance between its top 18a and the base 12 preferably lies in the range 1 millimeter (mm) to 12 mm.

Preferably, each layer is made initially by melting the second powder material 45 to constitute two angular beads 13a. Each angular bead 13a is geometrically defined by the intersection between an annular bead and an angular sector. Each angular bead 13a extends along two longitudinal edges from the top of the base 12 (or of the layer made beforehand), and thereafter the gap in the form of a depression between these two angular beads is filled by delivering the first powder material 35 into the localized melt generated by the laser beam, thereby building up the zone 15a that will constitute the final core 15.

In this manner, the angular beads 13a form a coating 13 layer by layer, while the zones 15a form the core 15 of the wiper 10.

Preferably, it is ensured that the first powder material 35 is identical to the material constituting the support, while the second powder material 45 is harder than the first material.

In this way, a coating 13 is obtained that is harder than the core 15.

It will thus be understood that, preferably, during step g) each layer of the angular sector in question is the result of performing the following two sub-steps:
- forming on the surface of the base 12 of the wiper 10 at least two angular beads 13a with the second powder material 45 because, during the preceding step, the optical head 34 and the nozzle 38 are moved angularly a little over the circumference relative to the previously-obtained localized region of extra thickness; and
- filling the zone 15a situated between the two angular beads 13a with the first powder material 35.

Each angular bead 13a is thus made by continuously making the deposit by laser spraying while turning the support 20 about the longitudinal axis X-X', and without moving the support 20 longitudinally.

The depression defined between the two angular beads 13a can be filled with the first material 35 in various different ways, including the following:
- either by an angular offset building up an angular bead little by little parallel to the beads 13a formed of the second powder material 45, and then performing a longitudinal offset on each new revolution so as to form a new angular bead;
- or else by performing a longitudinal offset (arrow 16 in FIG. 2) in order to fill the zone 15a in a longitudinal direction between two angular beads 13a and by performing an angular offset before forming a new longitudinal line in the opposite direction in order to fill the space between the two angular beads 13a by forming successive angular sectors.

FIG. 2 shows the result of making a plurality of layers to form a portion of the tip 14 of the wiper 10, while FIG. 3 shows the last step of building the wiper during which the final layer is sufficiently narrow for the two angular beads 13a to meet.

Thus, in FIG. 3, the annular wiper 10 is formed by a base 12 surmounted by a tip 14 that is constituted, for each tooth 18, by a core 15 made of the same material as the support 20, and by a coating 13 covering the entire core 15 and made of a material that is different from that of the core 15.

It should be observed that the present invention also covers the circumstances in which none of the base 12 is machined beforehand in the support 20, with the entire height of the wiper 10 being made by being built up in the manner described above, the base 12 then being constituted merely by an annular segment of the outside surface of the support 20 (not shown).

Likewise, using the same equipment as that described with reference to the figures, it is possible to envisage building up the tip 14 of the wiper 10 by progressively modifying the composition of the material from the outside surface forming the coating 13 towards the core 15 of the wiper 10 by causing the proportions between the first and second powder materials 35 and 45 to vary progressively.

The first source and the second source of powder materials 35 and 45 can be activated simultaneously so that the nozzle 38 sprays a mixture of the two powder materials, while taking care to adapt the proportions so that the coating 13 is richer in the second powder material 45 in order to make a coating 13 that is harder that the core 15.

Under such circumstances (not shown), the annular wiper 10 is formed by a base 12 surmounted by a tip 14 of composition that varies progressively between its core 15 and its surface 13.

In addition, the method in accordance with the present invention also covers the circumstance in which a single source of powder material is used for making the various teeth forming the entire tip 14 of the wiper 10.

It will be understood that the method proposed in the present invention serves firstly to avoid performing difficult machining, and secondly, when using two different materials for the core and the surface, to provide a coating in certain geometrical configurations that could not be implemented properly by a thermal spraying method.

Amongst the materials that can be used, it is preferable for the core 15 to be made of a metallic powder material having the same composition as the support 20, i.e. a titanium alloy or a nickel-based alloy, while for the coating 13, it is preferable to use materials that are hard and abrasive. In particular, for the coating 13, a selection should be made amongst metals that withstand oxidation when hot such as an alloy of the MCrAlY type (where M is a metal selected from nickel, cobalt, iron, and mixtures thereof), or an alloy based on cobalt, chromium, and tungsten, such as Stellite (registered trademark). It is also possible to use ceramics such as titanium dioxide ($TiO_2$), alumina ($AlO_2$), zirconia ($ZrO_2$), or a mixture based on at least one of them.

In addition, in the drawings, a wiper is shown that is directed radially outwards, however provision could be made to apply the present invention equally well to a wiper that is directed radially inwards.

Figure 5:
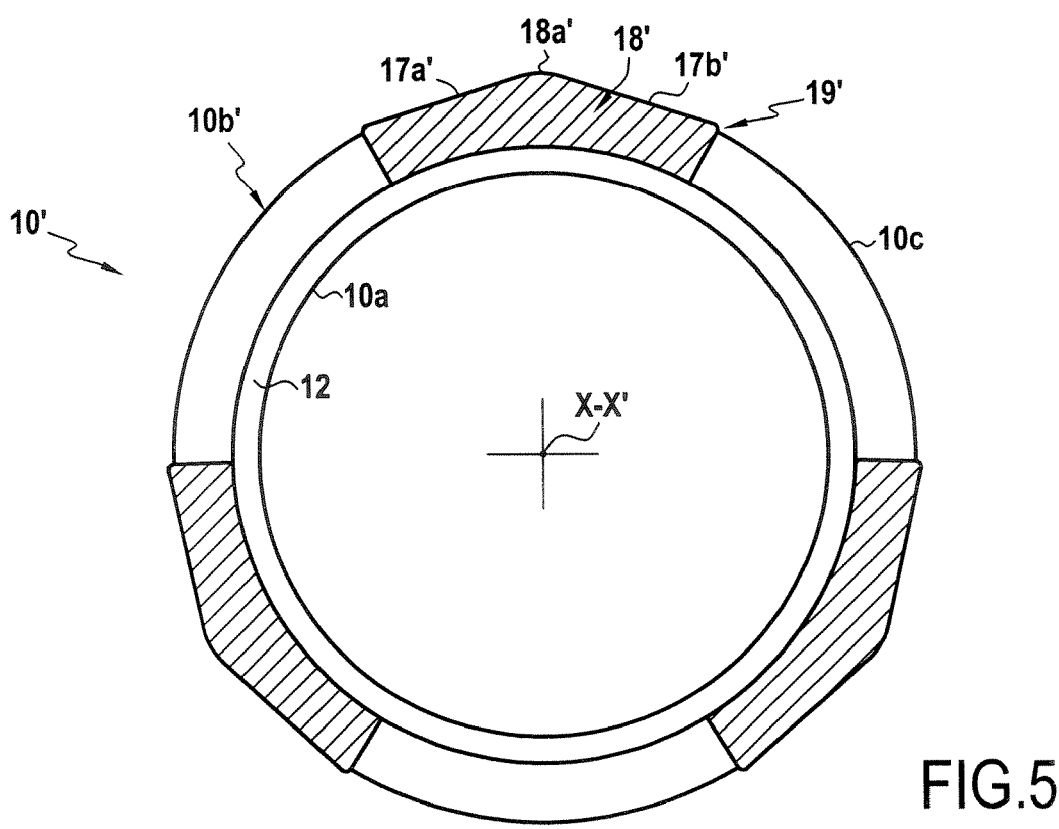
FIG. 5 is a view similar to that of FIG. 4, for a variant embodiment.

In the variant of FIG. 5, the wiper 10' extends radially between a circular inner outline 10a and an outer outline 10b', and it comprises three angular segments 10c of constant height alternating with three teeth 18' that project higher than the angular segments 10c at steps 19', thus forming discontinuities in the height of the wiper 10.

The teeth 18' form respective peaks between the two steps 19', with each tooth 18' rising circumferentially to its top 18a' from each of the steps.

In the variant of FIG. 5, the manufacturing method complies with the description above concerning the teeth 18', apart from shape in the circumferential direction.

However, concerning the segments 10c of constant height formed between the teeth 18', laser spraying is performed using the first material 35 alone, with an axial section identical to that of the radially-inner zone, except for the final layers that present a different shape.

Preferably, the height of each tooth 18', i.e. the radial distance between the top 18a' and the base 12 lies in the range 1 mm to 12 mm, and the tip 18a' of the tooth 18' projects by no more than 0.2 mm beyond the circle circumscribing the segments 10c of constant height.

In this second variant embodiment, it can be seen that each projecting portion is formed by a tooth 18 that presents a height that increases progressively from a gap 19' to a tip 18a' and that decreases progressively from said tip to the following gap 19'.

In both variant embodiments, it can be seen that the wiper forms a discontinuous ring presenting a plurality of projecting portions 18, 18' around its circumference leaving gaps 19, 19' or breaks in height therebetween.

Furthermore, in both variant embodiments, provision is advantageously made for the wiper 10 or 10' to have at least three projecting portions or teeth 18, 18'.

What is claimed is:

1. A thermomechanical turbomachine part that is circularly symmetrical about a longitudinal axis, the part including at least one annular wiper for a sealing labyrinth, said wiper being coated in an abrasive material, wherein the wiper presents height in a radial direction that varies around its circumference, forming a plurality of projecting portions, each presenting a height that increases progressively from a gap to a tip and that decreases progressively from said tip to the following gap.

2. A thermomechanical part according to claim 1, wherein the wiper forms a discontinuous ring presenting around its circumference a plurality of projecting portions between which there exists respective gaps or breaks in height.

3. A thermomechanical part according to claim 1, wherein the wiper has at least three projecting portions.

4. A thermomechanical part according to claim 1, constituting the rotor of a turbomachine.

5. A turbomachine including a thermomechanical part according to claim 1.

6. A method of fabricating an annular wiper on a thermomechanical support, in particular for a sealing labyrinth, the method comprising the following steps:
   a) providing a support with circular symmetry about a longitudinal axis, the support presenting an annular base for the wiper;
   b) providing at least one source of a powder material and a spray nozzle connected to said source and suitable for moving relative to the support:
   c) providing a laser source connected to an optical head suitable for moving relative to the support to focus a laser beam on a point of the surface of the support;
   d) aiming both the optical head and the nozzle at a common point on the surface at the top of the base of the wiper;
   e) activating the laser source and the source of powder material, thereby forming a localized melt at said point, into which the powder material is injected, thereby forming a localized region of increased thickness;
   f) aiming the optical head and the nozzle at another point on the surface at the top of the base adjacent to said localized region of extra thickness, and repeating step e) so long as the layer of material has not been terminated for the angular sector in question, said wiper comprising a plurality of angular sectors each containing a projecting portion; and
   g) building each projecting portion of the wiper by depositing successive layers that become narrower in the longitudinal direction on the surface at the top of the base, each layer being the result of performing steps d) to f).

7. A method according to claim 6, wherein, during step g), the layers are smaller and smaller in the circumferential direction.

8. A method according to claim 6, wherein, during step g), the layers remain centered about an angular zone remote from two gaps adjacent to the projecting portion for forming the tip of the projecting portion.

9. A method according to claim 6, wherein, during step g), the layers cover a circumferential end of the projecting portion.

10. A method according to claim 6, wherein, during step f), the surface of the top of the base of the wiper is followed in a longitudinal direction prior to changing angular sector.

11. A method according to claim 6, wherein, during step f), the laser source and the source of powder material remain activated.

12. A method according to claim 6, wherein, during step b), a first source of a first powder material and a second source of a second powder material are provided, said first source and said second source being connected to the spray nozzle.

13. A method according to claim 12, wherein the first material is identical to that of the support, and wherein the second material is harder than the first material.

14. A method according to claim 12, wherein, during step g), each layer of the angular sector in question is the result of performing the following sub-steps:

g1) forming on the surface of the base of the wiper at least two angular beads with the second powder material because, during step f), the optical head and the nozzle are moved angularly over the circumference relative to the previously-obtained localized region of extra thickness; and g2) filling the zone situated between the two angular beads with the first powder material.

15. A method according to claim 12, wherein, during step e), the first source and the second source of powder material are activated simultaneously so that the nozzle sprays a mixture of the powder materials.

16. A method according to claim 6, wherein the optical head and the spray nozzle are secured to each other in a common spray assembly of position that is adjustable relative to the support.

17. A method according to claim 6, wherein said support is a thermomechanical turbomachine part that is circularly symmetrical about a longitudinal axis.

18. A method according to claim 6, wherein, in step f), the angular sector in question defines a projecting portion between two gaps.

\* \* \* \* \*